US012081923B1

United States Patent
Yao et al.

(10) Patent No.: US 12,081,923 B1
(45) Date of Patent: Sep. 3, 2024

(54) LOW CONGESTION ROUTING METHOD OF OPTICAL NETWORK-ON-CHIP AND RELATED DEVICE

(71) Applicant: Beijing University of Posts and Telecommunications, Beijing (CN)

(72) Inventors: Qiuyan Yao, Beijing (CN); Daqing Meng, Beijing (CN); Hui Yang, Beijing (CN); Ao Yu, Beijing (CN); Jie Zhang, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 0 days.

(21) Appl. No.: 18/654,360

(22) Filed: May 3, 2024

(30) Foreign Application Priority Data

Sep. 1, 2023 (CN) .......................... 202311126409.3

(51) Int. Cl.
*H04Q 11/00* (2006.01)
(52) U.S. Cl.
CPC .............................. *H04Q 11/0062* (2013.01)
(58) Field of Classification Search
CPC ....... H04Q 2011/0064; H04Q 11/0062; H04Q 2011/0098
See application file for complete search history.

(56) References Cited

U.S. PATENT DOCUMENTS

| 2004/0022539 | A1* | 2/2004 | Bannister | H04Q 11/0005 398/55 |
| 2017/0005735 | A1* | 1/2017 | Li | H04B 10/503 |
| 2017/0127161 | A1* | 5/2017 | Song | H04L 49/1576 |

FOREIGN PATENT DOCUMENTS

| CN | 102638311 | A | | 8/2012 | |
| CN | 105453495 | A | | 3/2016 | |
| CN | 105871742 | A | | 8/2016 | |
| EP | 3226490 | B1 | * | 2/2019 | ......... G02B 6/12004 |
| JP | 2017069899 | A | * | 4/2017 | |

OTHER PUBLICATIONS

First Office Action issued in counterpart Chinese Patent Application No. 202311126409.3, dated Jan. 30, 2024.

* cited by examiner

*Primary Examiner* — Pranesh K Barua
(74) *Attorney, Agent, or Firm* — Westbridge IP LLC (57) ABSTRACT

Disclosed are a low congestion routing method of an Optical Network-on-Chip (ONoC) and related devices. In the method, a source IP node sends a route setup request to a first electrical router; the first electrical router determines a first target output port and sends the request to the destination IP node through the first target output port; the destination IP node generates an ACK packet and sends the ACK packet to a second electrical router; the second electrical router determines a second target output port and sends the ACK packet to the source IP node through the second target output port; the source IP node transmits the ACK packet to an optical transmission port, performs an E/O conversion on the ACK packet and sends an optical information packet through optical routers to the destination IP node; the destination IP node performs an O/E conversion on the optical information packet.

7 Claims, 5 Drawing Sheets

LOW CONGESTION ROUTING METHOD OF OPTICAL NETWORK-ON-CHIP AND RELATED DEVICE

CROSS-REFERENCE TO RELATED APPLICATIONS

This application claims priority to Chinese Patent Application No. 202311126409.3, filed on Sep. 1, 2023, the content of which is incorporated herein by reference in its entirety.

TECHNICAL FIELD

The present disclosure relates to resource control technique of Network-on-Chip (NoC), and in particular to a low congestion routing method of Optical Network-on-Chip (ONoC) and related devices.

BACKGROUND

With a rapid development of silicon-based photonic devices compatible with Complementary Metal Oxide Semiconductor (CMOS) processes, billions and more transistors can be integrated onto one chip to achieve a more powerful functionality. An optical network chip can interconnect a processing core effectively while achieving a higher transmission performance due to its advantages of a low crosstalk, a low delay and a low power consumption. Therefore, Optical network-on-chip (ONoC) is now employed as a promising candidate interconnection solution for its high bandwidth and low energy consumption.

However, ONOC still face such problems as a long end-to-end delay, congestions, a high transmission energy consumption, transmission losses and etc. Thus, there is a great need for a low congestion routing method of ONOC.

SUMMARY

In view of the above, the present disclosure provides a low congestion routing method of ONOC and related devices.

In examples of the present disclosure, the ONOC may refer to an ONoC with a Mesh topology. An electrical router and an optical router connecting to a same IP router have same coordinates with the IP router. The disclosed method may include the following steps: sending, by a source IP node, a route setup request to a first electrical router connected to the source IP node; where the route setup request comprises coordinates of the source IP node and coordinates of a destination IP node; and coordinates of the first electrical router are the same as the coordinates of the source IP node; receiving, by the first electrical router, the route setup request from the source IP node; determining a first target output port according to congestion information of buffer queues in transmittable directions and random numbers through an arbitration; sending the route setup request to the destination IP node through the first target output port; receiving, by the destination IP node, the route setup request; analyzing information about the source IP node in the route setup request; generating an Acknowledge (ACK) packet; sending the ACK packet to a second electrical router connected with the destination IP node; where the second electrical router is connected with the destination IP node and coordinates of the second electrical router are the same as the coordinates of the destination IP node; receiving, by the second electrical router, the ACK packet from the destination IP node; determining a second target output port according to congestion information of buffer queues in transmittable directions and random numbers through an arbitration; sending the ACK packet to the source IP node through the second target output port; locking the second target output port; controlling an optical router having the same coordinates as the second electrical router to turn on a micro-ring resonator in a corresponding direction; where the corresponding direction refers to a direction opposite to a transmission direction of the ACK packet; receiving, by the source IP node, the ACK packet; transmitting an information packet to an optical transmission port; performing, by the source IP node, an Electro-Optical (E/O) conversion on the information packet to obtain an optical information packet; sending the optical information packet to a first optical router connected to the source IP node; receiving, by the first optical router, the optical information packet from the source IP node; sending the optical information packet through a micro-ring resonator in the corresponding direction to the second optical router connected to the destination IP node; controlling the first electrical router having the same coordinates as the first optical router to open the second target output port; receiving, by the second optical router, the optical information packet; sending the optical information packet to the destination IP node; receiving, by the destination IP node, the optical information packet; and performing an Optical-Electro (O/E) conversion on the optical information packet; where the congestion information comprises: the number of packets buffered; the determining a first target output port according to congestion information of buffer queues in transmittable directions and random numbers through an arbitration comprises: determining a port of a first transmittable direction and a port of a second transmittable direction of the first electrical router according to the coordinates of the source IP node, the coordinates of the destination IP node and directions of ports of the first electrical router connecting with other electrical routers; determining a first arbitration range for the port of the first transmittable direction based on the number of packets in a first buffer queue of the port of the first transmittable direction; determining a second arbitration range for the port of the second transmittable direction based on the number of packets in a second buffer queue of the port of the second transmittable direction; generating a first random number according to the first arbitration range; generating a second random number according to the second arbitration range; and determining the first target output port according to the first random number and the second random number; and the determining a second target output port according to congestion information of buffer queues in transmittable directions and random numbers through an arbitration comprises: determining a port of a third transmittable direction and a port of a fourth transmittable direction of the second electrical router according to the coordinates of the destination IP node, the coordinates of the source IP node and directions of ports of the second electrical router connecting with other electrical routers; determining a third arbitration range for the port of the third transmittable direction based on the number of packets in a third buffer queue of the port of the third transmittable direction; determining a fourth arbitration range for the port of the fourth transmittable direction based on the number of packets in a fourth buffer queue of the port of the fourth transmittable direction; generating a third random number according to the third arbitration range; generating a fourth random number according to the fourth arbitration range; and determining the second target output port according to the third random number and the fourth random number.

Examples of the present disclosure also provides an electronic device, which includes: a memory, a processor, and a computer program stored in the memory and executable on the processor. The processor executes the program to implement the routing method described above.

Examples of the present disclosure also provide a non-transient computer-readable storage medium which stores computer instructions for causing a computer to execute the method described above.

The low congestion routing method of ONOC and related devices according to examples of the present disclosure are proposed on the basis of connections between network nodes, in conjunction with buffer queues in routers connecting to the network nodes. In the method proposed, a routing path of an information packet can be adjusted dynamically by a multi-path routing allocation scheme provided by an arbiter. In this way, the transmission capability of the ONOC can be improved, and the problems of a long end-to-end delay, network congestions, a high transmission power consumption and transmission losses of the ONOC can be solved to some extent.

BRIEF DESCRIPTION OF THE DRAWINGS

In order to describe technical solutions of the present application or related arts more clearly, accompanying drawings required for describing examples or the related art are introduced briefly in the following. Apparently, the accompanying drawings in the following descriptions only illustrate some examples of the present application, and those of ordinary skill in the art may still derive other drawings from these drawings without creative efforts.

DETAILED DESCRIPTION OF THE EMBODIMENTS

Hereinafter, in order to make the objective(s), technical solution(s) and advantages of the present application clearer and more understandable, the present application will be further described in detail, in connection with specific embodiments and with reference to the accompanying drawings.

It is necessary to be noted that the technical terms or scientific terms used in the embodiments of the present application should have common meanings as understood by those skilled in the art of the present application, unless otherwise defined. The "first", "second" and similar words used in the embodiments of the present application do not refer to any sequence, number or importance, but are only used to distinguish different component portions. The "comprise", "include" or a similar word means that an element or item before such word covers an element or item or any equivalent thereof as listed after such word, without excluding other elements or items. The "connect" or "interconnect" or a similar word does not mean being limited to a physical or mechanical connection, but may include a direct or indirect electrical connection. The "upper", "lower", "left" and "right" are used only to indicate a relative position relation, and after the absolute position of the described object is changed, the relative position relation may be changed accordingly.

In recent years, demands for a higher communication bandwidth and a higher computing performance have greatly increased. Conventional ONoCs with a single wavelength have difficulties in providing a high-speed transmission with a large capacity. In this case, ONoC adopting the wavelength division multiplexing technology is used to increase the communication bandwidth effectively by multiplexing multiple optical signals with different wavelengths into a single waveguide for transmission.

For the above purposes, researchers have developed deterministic routing methods oriented to a Mesh (Wireless Mesh Network) topology for ONoCs to reduce the transmission delay. From the present researches, the main problems faced by low congestion techniques to reduce an end-to-end delay may include: single routing path, inefficient link utilization, and overly simple routing.

Figure 1:
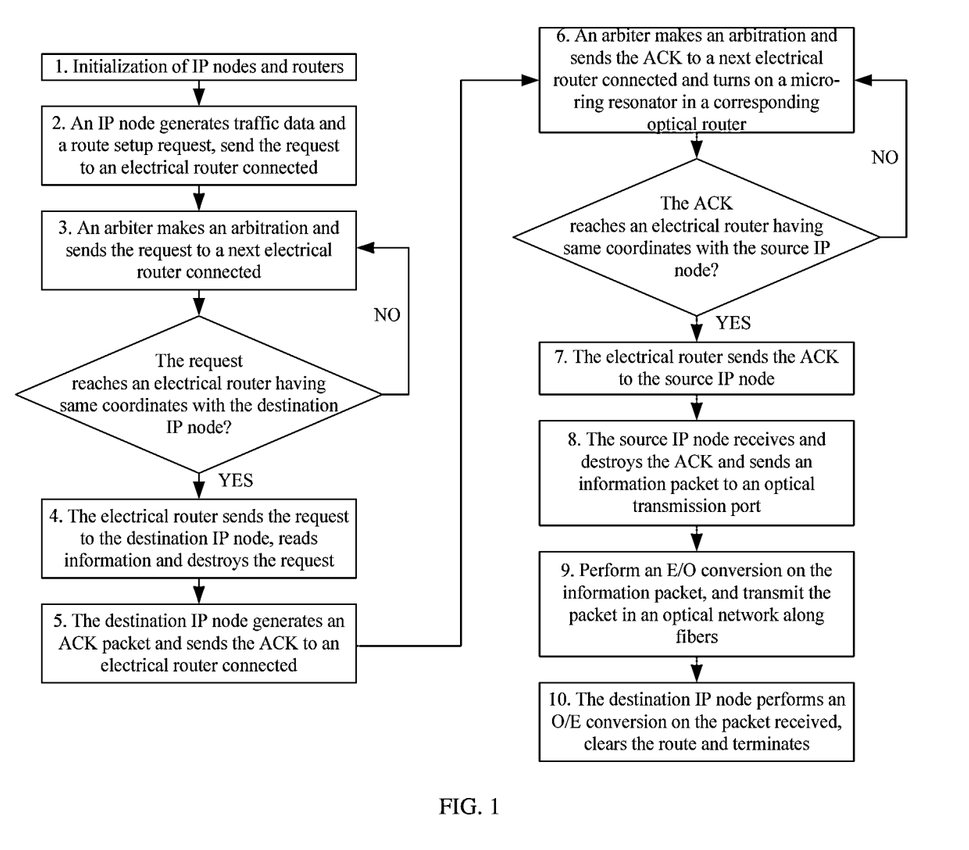
FIG. 1 is a schematic diagram of an overall flow of low congestion routing of ONoC according to examples of the present disclosure.

In view of the above, the present disclosure provides a low congestion routing method of ONOC with a Mesh topology. As shown in FIG. 1, the method is proposed on the basis of connections between network nodes, in conjunction with buffer queues in routers connecting the network nodes. In the method proposed, a routing path of an information packet can be adjusted dynamically by a multi-path routing allocation scheme provided by an arbiter. In this way, the transmission capability of the ONOC can be improved, and the problems of a long end-to-end delay, network congestions, a high transmission power consumption and transmission losses of the ONOC can be solved to some extent.

Examples of the present disclosure provides an ONOC system. The ONOC system may include a signaling layer, an optical network layer, and IP nodes. The signaling layer may include electrical routers and electrical channels. The optical network layer may include optical routers and fibers. Each IP node may include a traffic generation module, an E/O converter (an electrical/optical converter), an O/E converter (an optical-to-electrical converter). The electrical channels may refer to physical wires for data transmission and the fibers may refer to physical fibers for data transmission. The electrical channels and fibers function as network transmission media which provide transparent transmission channels.

Figure 2:
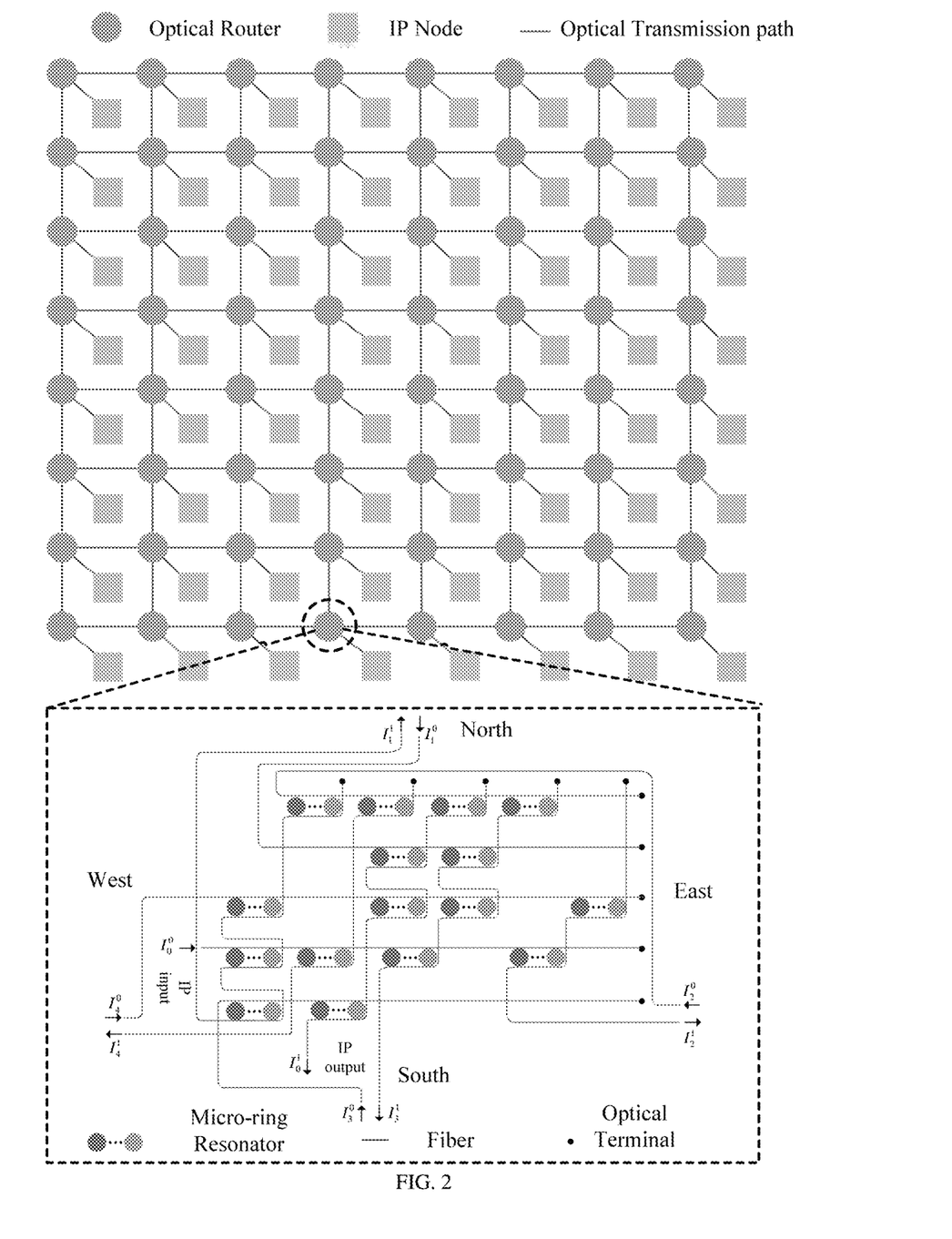
FIG. 2 is a schematic diagram illustrating a topology of ONOC and a structure of an optical router according to examples of the present disclosure.
Figure 3:
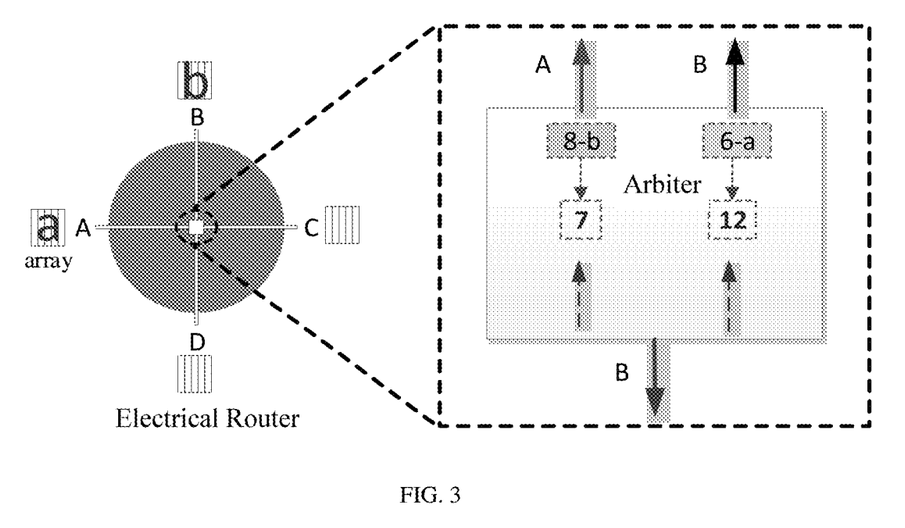
FIG. 3 is a schematic diagram illustrating a structure of an arbiter based on the MLA-OE algorithm according to examples of the present disclosure.

An IP node refers to a network edge point, which is used to connect a user terminal with input/output ports of an electrical channel and a fiber. The IP node has functions of network transmissions, E/O conversions and O/E conversions. As shown in FIG. 3, an electrical router may be used to connect an IP node and other electrical routers to transmit and route signaling, which provides supports for connecting node-to-node transmission links. As shown in FIG. 2, an optical router may include ports connecting an IP node and other optical routers node. The optical router may further include a number of micro-ring resonators to provide supports for high-speed node-to-node data transmissions.

In some examples of the present disclosure, each of the IP nodes may be provided with a data collection module for collecting performance parameters of the IP node for data analysis. The performance parameters may include: traffic data flowing into or out of the IP node, time delays of the traffic data and etc.

In some examples of the present disclosure, each of the electrical routers may have an arbiter. The arbiter may be coupled to buffer queues of the electrical router for receiving buffer queue information which can be used in routing.

In some examples of the present disclosure, the traffic data may be generated at each of the IP nodes based on a uniform traffic model. The traffic data may include route setup requests, ACK packets, and information packets.

In some examples of the present disclosure, a new routing method which is called an MLA-OE routing algorithm is proposed based on a deterministic routing algorithm for a Mesh topology. The MLA-OE routing algorithm may be written into each of the electrical routers. Specific improvements of the MLA-OE routing algorithm are embodied in arbitration policies. A path with less congestions may be selected based on weighted probabilities. At the same time, arbiters in electrical routers are designed based on Lottery arbitration and Round Robin arbitration. In this way, the number of ports of the electrical routers can be reduced. Therefore, the power consumption can be reduced accordingly.

It should be understood that in the examples of the present disclosure, traffic data flowing into or out of an IP node may not exceed a capacity of the fiber.

Figure 4:
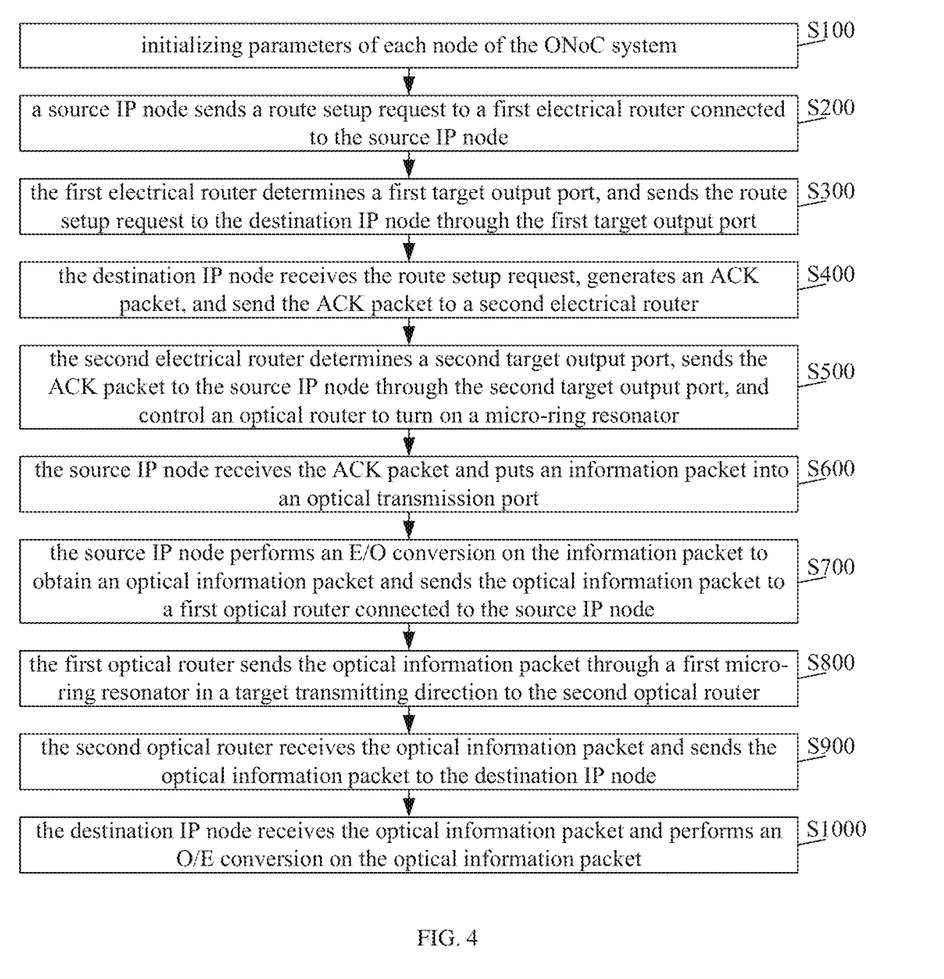
FIG. 4 is a flowchart of a low congestion routing method of ONOC according to examples of the present disclosure.

Based on the ONOC system, the present disclosure provides a low congestion routing method. The ONOC may refer to an ONOC with a Mesh topology. Specifically, the ONoC disclosed may include a plurality of electrical routers, a plurality of optical routers, and a plurality of IP nodes. The electrical routers, the optical routers, and the IP nodes can be collectively referred to as nodes. Where, an electrical router is configured to connect an IP node and other electrical router. An optical router may include ports that connect an IP node and other optical routers. As shown in FIG. 4, the method may include the following steps.

In S100, initializing parameters of each node of the ONOC system.

In examples of the present disclosure, the parameter may include: time information, a traffic model, a sending flag, a receiving flag, a length of a route setup request, a length of an ACK packet and a length of an information packet.

In S200, a source IP node may send a route setup request to a first electrical router connected to the source IP node.

In examples of the present disclosure, the route setup request may include: coordinates of the source IP node and coordinates of a destination IP node. To be noted, in examples of the present disclosure, coordinates of the first electrical router may be the same as the coordinates of the source IP node.

In S300, the first electrical router may receive the route setup request from the source IP node, determine a first target output port according to congestion information of one or more buffer queues in one or more transmittable directions, and send the route setup request to the destination IP node through the first target output port.

In S400, the destination IP node may receive the route setup request, generate an ACK packet, and send the ACK packet to a second electrical router connected to the destination IP node.

In examples of the present disclosure, the ACK packet may include the coordinates of the source IP node.

In S500, the second electrical router may receive the ACK packet from the destination IP node, determine a second target output port according to congestion information of one or more buffer queues in one or more transmittable directions, send the ACK packet to the source IP node through the second target output port, and control an optical router having the same coordinates as the second electrical router to turn on a second micro-ring resonator in a target transmission direction.

In examples of the present disclosure, the target transmission direction may refer to a direction opposite to a transmission direction of the ACK packet.

In S600, the source IP node may receive the ACK packet and put an information packet into an optical transmission port.

In S700, the source IP node may perform an E/O conversion on the information packet to obtain an optical information packet and send the optical information packet to a first optical router connected to the source IP node.

In S800, the first optical router may receive the optical information packet from the source IP node, send the optical information packet through a first micro-ring resonator in a target transmitting direction to the second optical router connected to the destination IP node.

In examples of the present disclosure, the first optical router may control the first electrical router having the same coordinates as the first optical router to re-open the second target output port which was locked before.

In S900, the second optical router may receive the optical information packet and send the optical information packet to the destination IP node.

In S1000, the destination IP node may receive the optical information packet and perform an O/E conversion on the optical information packet to recover the information packet.

It should be understood that in an ONOC with a Mesh topology, each electrical router, each optical router, and each IP node connected thereto need to be numbered. In the following, a two-dimensional coordinate system is taken as an example. Assuming that the horizontal direction is the X direction and the vertical direction is the Y direction. In this way, a two-dimensional coordinate system is established. In this system, each node has its corresponding coordinates to represent its own number. To be noted, an electrical router and an optical router connected with a same IP node may have the same coordinates with the IP node connected.

In S100, all nodes in the ONOC with the Mesh topology, including each electrical router, each IP node and each optical router, should be initialized at first. For the IP node, a traffic model, a transmit flag, a receive flag, a length of the route setup request, a length of the ACK packet and a length of the information packet should be determined during the initialization process. Further, the IP node should initialize time to ensure an accurate clock frequency. An electrical router may initialize ports connecting other electrical routers or IP nodes in an X positive direction, an X negative direction, a Y positive direction and a Y negative direction. The electrical router may further initialize its internal buffer queues and arbiters.

In S200, the source IP node may determine the coordinates of the source IP node and the coordinates of the destination IP node through an IP-Sorce module of the source IP node. Then, the source IP node may generate a route setup request and add the coordinates of the source IP node and the coordinates of the destination IP node in the route setup request. Further, the source IP node may send the route setup request to the first electrical router connected to the source IP node through an IP-Switch module of the source IP node. To be noted, the first electrical router may have the same coordinates as the source IP node.

In some examples of the present disclosure, the route setup request may be sent to an end of a buffer queue of an input port of the first electrical router by the IP-Switch module of the source IP node.

In S300, the step of determining the first target output port may be performed by an arbiter of the first electrical router.

Figure 5:
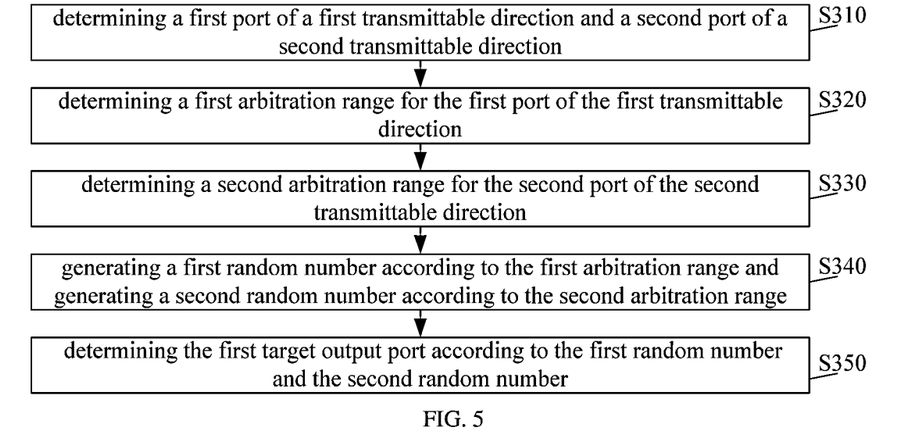
FIG. 5 is a flowchart of a method for determining the first target output port according to examples of the present disclosure.

In some examples of the present disclosure, the congestion information may include: the number of buffered packets in a buffer queue. To be specific, as shown in FIG. 5, the step of determining the first target output port may include the following steps.

In S310, determining a first port of a first transmittable direction and a second port of a second transmittable direction of the first electrical router according to the coordinates of the source IP node, the coordinates of the destination IP node and directions of ports of the first electrical router connecting with other electrical routers.

It should be understood that, based on the coordinates of the source IP node and the coordinates of the destination IP node, a first direction can be determined as being from the source IP node to the destination IP node. Based on the first direction, the first port of the first transmittable direction and the second port of the second transmittable direction of the first electrical router can be determined.

Taking a network with a size of 8×8 as an example. In this example, the coordinates of the source IP node are set to (0,1) and the coordinates of the destination IP node are set to be (6,5). Then, when starting a data transmission from the source IP node, the direction of transmission can only be north or cast. Then the first port of the first transmittable direction may be determined to be the port in the north direction and the second port of the second transmittable direction of the first electrical router may be determined to be the port in the cast direction.

In S320, determining a first arbitration range for the first port of the first transmittable direction based on the number of packets in a first buffer queue of the first port of the first transmittable direction.

In some examples, the first arbitration range may be adjustable. For example, the first arbitration range may be [e1,b], where e1 may be a constant and b may refer to the congestion information of the first port in the first transmittable direction, such as the number of packets in the first buffer queue. It should be noted that b may be set as greater than e1.

In S330, determining a second arbitration range for the second port of the second transmittable direction based on the number of packets in a second buffer queue of the second port of the second transmittable direction.

In some examples, the second arbitration range may be adjustable. For example, the second arbitration range may be [e2,c], where e2 may be a constant and c may refer to the congestion information of the second port in the second transmittable direction, such as the number of packets in the second buffer queue. It should be noted that c may be set as greater than e2.

In S340, generating a first random number according to the first arbitration range and generating a second random number according to the second arbitration range.

For example, the first random number may be generated within the first arbitration range [e1, b], and the second random number may be generated within the second arbitration range [e2, c].

In S350, determining the first target output port according to the first random number and the second random number.

In examples of the present disclosure, the first target output port may be determined by comparing the first random number and the second random number. In this way, a shortest path can be obtained to improve a transmission efficiency.

In examples of the present disclosure, determining the first target output port according to the first random number and the second random number may include: comparing the first random number and the second random number; in response to determining that the first random number is less than or equal to the second random number, determining that a first port of the first transmittable direction is the first target output port; or, in response to determining that the first random number is greater than the second random number, determining that the second port of the second transmittable direction is the first target output port.

In some examples of the present disclosure, upon determining the first target output port, the route setup request may be sent out through the first target output port and then the first target output port may be locked. For example, the first target output port may be set to a busy state. In this way, transmissions of other traffic data at the first target output port prior to the transmission of the route setup request may be avoided. Thus, the transmission rate of the route setup request can be increased.

In some examples of the present disclosure, if the input port of the first electrical router, through which the route setup request is received, connects to an IP core, the input port should be locked too.

In some examples of the present disclosure, in response to determining that the route setup request is transmitted completely, that is, in response to determining that the route setup request is sent out through the first target output port, the first electrical router may clear the route setup request received and re-open the first target output port. In this way, the first target output port can be put back into service. In the above method, by clearing the route setup request buffered, memory occupations can be reduced, therefore, the efficiency of performance can be improved.

In some examples of the present disclosure, there may be a plurality of electrical routers between the source IP node and the destination IP node. Except for the first electrical router connected to the source IP node, and the second electrical router connected to the destination IP node, other electrical routers may all be deemed as intermediate electrical routers. Then, the route setup request may be sent out through the first target output port of the first electrical router to an intermediate electrical router connected to the first target output port at first. Then, the route setup request may be transmitted among one or more intermediate electrical routers until the route setup request reaches the second electrical router which has the same coordinates as the destination IP node. Later, the route setup request may be transmitted by the second electrical router to the destination IP node.

That is, the step of sending the route setup request to the destination IP node through the first target output port may include the following steps: sending the route setup request through the first target output port to an intermediate electrical router connecting to the first target output port; and transmitting the route setup request among one or more intermediate electrical routers until the route setup request reaches the second electrical router.

According to some examples of the present disclosure, a same procedure may be performed in each of the intermediate electrical routers. That is, at each of the intermediate electrical routers, a first target intermediate output port can be determined according to congestion information of buffer queues of transmittable directions. In this way, a better path allocation scheme can be obtained, thereby, the performance of the entire network can be improved and the end-to-end delay can also be reduced.

In S400, after receiving the route setup request, the destination IP node may analyze information of the source IP node in the route setup request. That is, the destination IP node may obtain the coordinates of the source IP node in the route setup request. Then, the destination IP node may destroy the route setup request through an IP-Sink module. Further, the destination IP node may generate an ACK packet through an IP-Sorce module and add the coordinates of the source IP node into the ACK packet. Moreover, the destination IP node may send the ACK packet through an IP-Switch module to the second electrical router connected to the destination IP node.

In some examples of the present disclosure, the ACK packet may be sent to an end of a buffer queue of an input port of the second electrical router by the IP-Switch module of the destination IP node.

In S500, the step of determining the second target output port may be performed by an arbiter of the second electrical router.

Figure 6:
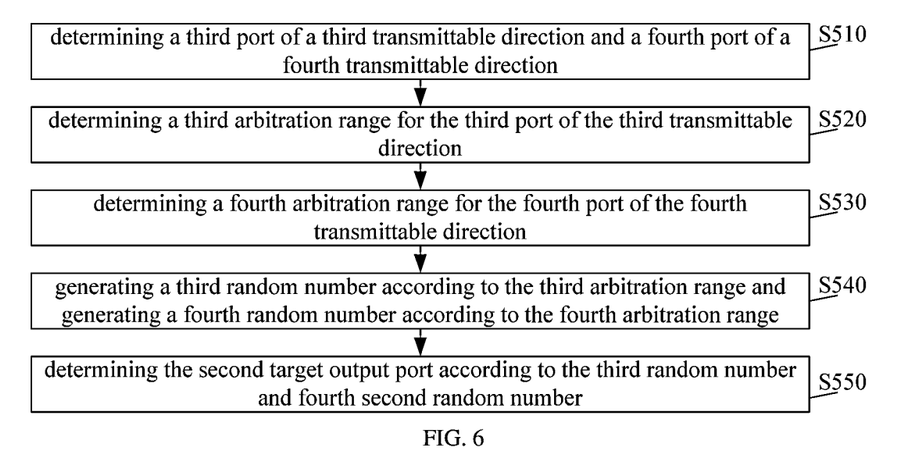
FIG. 6 is a flowchart of a method for determining the second target output port according to examples of the present disclosure.

In examples of the present disclosure, the congestion information may include: the number of packets in the buffer queue. To be specific, as shown in FIG. 6, the step of determining a second target output port may include the following steps.

In S510, determining a third port of a third transmittable direction and a fourth port of a fourth transmittable direction of the second electrical router according to the coordinates of the destination IP node, the coordinates of the source IP node and directions of ports of the second electrical router connecting other electrical routers.

It should be understood that, based on the coordinates of the destination IP node and the coordinates of the source IP node, a second direction can be determined as being from the destination IP node to the source IP node. Based on the second direction, the third port of the third transmittable direction and the fourth port of the fourth transmittable direction of the second electrical router can be determined.

Taking a network with a size of 8×8 as an example. In this example, the coordinates of the source IP node are set to (0,1) and the coordinates of the destination IP node are set to be (6,5). Then, when starting a data transmission from the destination IP node, the direction of transmission can only be west or south. Then the third port of the third transmittable direction may be determined to be the port in the west direction and the fourth port of the fourth transmittable direction of the second electrical router may be determined to be the port in the south direction.

In S520, determining a third arbitration range for the third port of the third transmittable direction based on the number of packets in a third buffer queue of the third port of the third transmittable direction.

In some examples of the present disclosure, the third arbitration range may be adjustable. For example, the third arbitration range may be [e3,a], where e3 may be a constant and a may refer to congestion information of the third port in the third transmittable direction, such as the number of packets in the third buffer queue. It should be noted that a may be set as greater than e3.

In S530, determining a fourth arbitration range for the fourth port of the fourth transmittable direction based on the number of packets in a fourth buffer queue of the fourth port of the fourth transmittable direction.

In some examples of the present disclosure, the fourth arbitration range may be adjustable. For example, the fourth arbitration range may be [e4,d], where e4 may be a constant and d may refer to congestion information of the fourth port in the fourth transmittable direction, such as the number of packets in the fourth buffer queue. It should be noted that d may be set as greater than e4.

In S540, generating a third random number according to the third arbitration range and generating a fourth random number according to the fourth arbitration range.

For example, the third random number may be generated within the third arbitration range [e3, a], and the fourth random number may be generated within the fourth arbitration range [e4, d].

In S550, determining the second target output port according to the third random number and fourth second random number.

In examples of the present disclosure, the second target output port may be determined by comparing the third random number and the fourth random number. In this way, a shortest path can be obtained to improve a transmission efficiency.

In examples of the present disclosure, determining the second target output port according to the third random number and the fourth random number may include: comparing the third random number and the fourth random number; in response to determining that the third random number is less than or equal to the fourth random number, determining that a third port of the first transmittable direction is the second target output port; or, in response to determining that the third random number is greater than the fourth random number, determining that the fourth port of the second transmittable direction is the second target output port.

In some examples of the present disclosure, upon determining the second target output port, the ACK packet may be sent out through the second target output port and then the second target output port may be locked. Further, the second optical router having the same coordinates as the second electrical router may be controlled to turn on a second micro-ring resonator in the target transmission direction. The target transmission direction may refer to a direction opposite to a transmission direction of the ACK packet. For example, the second target output port may be set to a busy state. In this way, transmissions of other traffic data at the second target output port prior to the transmission of the ACK packet may be avoided. Thus, the transmission rate of the ACK packet can be increased.

In some examples of the present disclosure, if the input port of the second electrical router, through which the ACK packet is received, connects to an IP core, the input port should be locked too.

In some examples of the present disclosure, in response to determining that the ACK packet is transmitted completely, that is, in response to determining that the ACK packet is sent out through the second target output port, the second electrical router may clear the ACK packet received. In the above method, by clearing the ACK packet buffered, memory occupations can be reduced, therefore, the efficiency of performance can be improved.

In some examples of the present disclosure, there may be a plurality of electrical routers between the destination IP node and the source IP node. Except for the first electrical router connected to the source IP node, and the second electrical router connected to the destination IP node, other electrical routers may all be deemed as intermediate electrical routers. Then, the ACK packet may be sent out through the second target output port of the second electrical router to an intermediate electrical router connected to the second target output port at first. Then, the ACK packet may be transmitted among one or more intermediate electrical routers until the ACK packet reaches the first electrical router which has the same coordinates as the source IP node. Later, the ACK packet may be transmitted by the first electrical router to the source IP node.

That is, the step of sending the ACK packet to the source IP node through the second target output port may include the following steps: sending the ACK packet through the second target output port to an intermediate electrical router connecting to the second target output port; and transmitting the ACK packet among one or more intermediate electrical routers until the ACK packet reaches the first electrical router.

According to some examples of the present disclosure, a same procedure may be performed in each of the intermediate electrical routers. That is, at each of the intermediate electrical routers, a second target intermediate output port can be determined according to congestion information of buffer queues of transmittable directions. In this way, a better path allocation scheme can be obtained, thereby, the performance of the entire network can be improved and the end-to-end delay can also be reduced.

In S600, after receiving the ACK packet, the source IP node may destroy the ACK packet through the IP-Sink module.

In some examples of the present disclosure, an information packet may be then placed at the end of a buffer queue of an optical transmission port of the source IP node.

In S700, after the information packet is sent out from the optical transmission port of the source IP node, an E/O conversion can be performed on the information packet by the electro-optical conversion module of the source IP node to obtain an optical information packet. Then, the optical information packet obtained can be transmitted in the optical network layer.

In S800, after arriving at the first optical router, the optical information packet may be transmitted in a path set by the ACK packet. That is, the path along which the ACK packet is transmitted from the destination IP node through the second electrical router back to the source IP node is the opposite to the path along which the optical information packet is transmitted from the source IP node through the first optical router to the destination IP node. When the optical information packet passes through the first optical router, the transmission path of the optical information packet can be switched through the first micro-ring resonator. When the optical information packet reaches an optical router, the optical router may control an electrical router with the same coordinates as the optical router to re-open the port locked previously. That is, the optical router may control the electrical router with the same coordinates as the optical router to re-open the port which is locked when the ACK packet passes through the electrical router.

In some examples of the present disclosure, there may be a plurality of optical routers between the source IP node and the destination IP node. Except for the first optical router connected to the source IP node, and the second optical router connected to the destination IP node, other optical routers may all be deemed as intermediate optical routers. When the optical information packet passes through an intermediate optical router, the intermediate optical router may control an intermediate electrical router with the same coordinates as the intermediate optical router to re-open the second target intermediate output port locked previously. That is, the intermediate optical router may control the intermediate electrical router with the same coordinates as the intermediate optical router to re-open the port which was locked when the ACK packet passed through.

In S900, the destination IP node may perform an O/E conversion on the optical information packet. The information packet obtained after the O/E conversion may be sent to an IP-Switch module of the destination IP node.

Then, the entire transmission path may be cleared and the routing process terminates.

The low congestion routing method of an ONOC and the ONOC system according to examples of the present disclosure may have the following effects.

Firstly, an MLA-OE multi-path routing algorithm based on Mesh topology is provided to reduce congestions in a certain dimension. By this method, congestions in the signaling layer can be reduced, while link utilizations can be improved. Moreover, the network burden in case of a high injection rate may be relieved.

Secondly, by analyzing a four-port Lottery arbiter and a Round-Robin arbiter, an arbiter suitable for multipath algorithms is designed. The arbiter combines both the fairness of Round-Robin and the assignment of Lottery, while further considering a current congestion situation. Therefore, the arbiter may give a reasonable path allocation scheme, which may improve the performance of the network.

Thirdly, for path allocations, by analyzing congestion information, paths with less congestions may be selected based on weighted probabilities. It is possible to alleviate the burden of the network when a network injection volume increases. Moreover, an end-to-end delay can also be reduced.

Lastly, the low congestion routing method of the ONOC with a Mesh topology proposed in the present disclosure acts only on network layer. That is, the method does not bring any additional internal interference factor to subsequent optical transmissions, thus the adaptability of method proposed is strong.

To be noted, the traffic model, the access time, the number of IP nodes and the number of routers used in the metropolitan network are not limited by the present disclosure.

For a better understanding of the present disclosure, the routing method will now be described in further detail with reference to the following example.

To be noted, the experimental method described in the following example is a conventional method using a uniform flow model. The topology model, if not specifically stated, can be available from open sources.

In this example, taking a network with a scale of 8*8 as an example. In an ONOC with a Mesh topology, each electrical router, each optical router, and each IP node connected thereto need to be numbered. Assuming that the horizontal direction is the X direction, which is from 0 to 7, and the vertical direction is the Y direction, which is from 0 to 7. In this way, a two-dimensional coordinate system can be established. In this ONOC system, each node has its coordinates to represent its own number. The electrical router and the optical router connected with a same IP node may have the same coordinates with the IP node. For example, in the following, IP(0,0) may represent an IP node whose coordinates are (0,0). Router(3,2) may represent a router whose coordinates are (3,2). Examples of sending an information packet from a source IP node IP(0,1) to a destination IP node IP(6,5) will be described in detail.

As shown in FIG. 1, the implementation procedure is as follows.

In Step 1, each node in the ONOC system would be initialized. The IP node is used to determine a traffic model, a transmit flag, a receive flag, a length of the route setup request, a length of the ACK packet and a length of the information packet. Further, the IP node is used to initialize time to ensure an accurate clock frequency. Assuming that the length of the route setup request is 32 bits, the length of the ACK packet is 32 bits, the length of the information packet is 1024 bits, the operating frequency is 1 GHZ, and the injection rate is 0.15. An electrical router may initialize ports connecting other electrical routers or IP nodes in an X positive direction, an X negative direction, a Y positive direction and a Y negative direction. The electrical router may further initialize its internal buffer queues and arbiters. Assuming that the number of IP cores connected to a routing node is 1.

In step 2, the source IP node IP(0,1) may start to generate traffic data. The IP-Sorce module of IP(0,1) determines that the coordinates of the source IP node are (0,1) and the coordinates of the destination IP node are (6,5). The source IP node may generate a route setup request and add the coordinates of the source IP node and the destination IP node into the route setup request. The IP-Switch module may send the route setup request to an end of a buffer queue of an input port of a first electrical router Router(0,1) connected to the source IP node IP(0,1). The routing-switch module would wait for a rolling_check to send the route setup request.

In step 3, when the first electrical router Router(0,1) prepares to send the route setup request to another electrical router, the arbiter inside Router(0,1) is first queried. In order to satisfy a shortest path routing, transmittable directions may include two directions, that is, a first direction to Router(1,1) and a second direction to Router(0,2). The arbiter may make an arbitration by collecting congestion information of buffer queues in these two transmittable directions. Assuming that the port of a router connecting another router in west is denoted by Port A, the port of a router connecting another router in north is denoted by Port B, the port of a router connecting another router in cast is denoted by Port C, and the port of a router connecting another router in south is denoted by Port D. Therefore, in this example, the output ports of the transmittable directions are Port B and Port C. The arbiter may generate a random number within an arbitration range based on the congestion information for each transmittable direction and make a decision based on the random numbers. For example, if the random number generated for Port B is greater than or equal to the random number generated for Port C, the route setup request would be sent out from Port C; if the random number generated for Port C is greater than the random number generated for Port B, the route setup request would be sent out from Port B. The arbitration ranges are adjustable. Assuming that the arbitration range of Port B is [12, b] and the arbitration range of Port C is [8, c] (b is greater than 12 and c is greater than 8). Where b represents the number of packets in the buffer queue of Port B and c represents the number of packets in the buffer queue of Port C. Assuming that b=24 and c=96. In this case, the arbitration range of Port B is [12, 24] and the arbitration range of Port C is [8, 96].

In this step, the arbiter generates a random number of 16 for Port B and a random number of 24 for Port C. Therefore, after the arbitration, the route setup request would be sent out from Port B. That is, the route setup request would be send to Router(1,1). Router(0,1) may send the route setup request through Port B, then lock Port B (be set to busy). Moreover, if the input port of Router(0,1) is connected to the IP core, the input port is also locked. The route setup request would be destroyed and Port B would be re-opened after the transmission of the route setup request is complete. Port B would then wait for arrivals of other packets. Then, the route setup request may be transmitted among a plurality of intermediate electrical routers until the route setup request reaches the second electrical router Router(6,5) which has the same coordinates as the destination IP node IP(6,5). In this process, each intermediate electrical router would perform a same procedure as Router(0,1).

In step 4, the route setup request may be transmitted through a port of Router(6,5) to the IP-Switch module of IP(6,5).

In step 5, upon receiving the route setup request, IP(6,5) may obtain the coordinates of IP(0,1) from the route setup request and then destroy the route setup request by the IP-Sink module. Then, the IP-Sorce module may generate an ACK packet and add the coordinates of IP(0,1) in the ACK packet. Moreover, the IP-Switch module may send the ACK packet to an end of a buffer queue of an input port of Router(6,5) connected thereto.

In step 6, when Router(6,5) prepares to send the ACK packet to another electrical router, the arbiter inside Router (6,5) is first queried. In order to satisfy a shortest path routing, transmittable directions may include two directions, that is, a third direction to Router(5,5) and a fourth direction to Router(6,4). The arbiter may make an arbitration by collecting congestion information of buffer queues in the transmittable directions. Assuming that the port of a router connecting another router in west is denoted by Port A, the port of a router connecting another router in north is denoted by Port B, the port of a router connecting another router in east is denoted by Port C, and the port of a router connecting another router in south is denoted by Port D. Therefore, in this example, the output ports of the transmittable directions are Port A and Port D. The arbiter may generate a random number within an arbitration range based on the congestion information for each transmittable direction and make a decision based on the random numbers. For example, if the random number generated for Port A is greater than or equal to the random number generated for Port D, the ACK packet would be sent out from Port D; if the random number generated for Port A is less than the random number generated for Port D, the ACK packet would be sent out from Port A. The arbitration ranges are adjustable. Assuming that the arbitration range of Port A is [12, a] and the arbitration range of Port D is [8, d] (a is greater than 12 and d is greater than 8). Where, a represents the number of packets in the buffer queue of Port A and d represents the number of packets in the buffer queue of Port D. Assuming that a=25 and d=35. In this case, the arbitration range of Port A is [12, 25] and the arbitration range of Port D is [8, 35]. In this step, the arbiter generates a random number of 24 for Port A and a random number of 20 for Port D. Therefore, after the arbitration, the ACK packet would be sent out from Port D. That is, the ACK packet would be sent to Router(6,4).

In step 7, Router(6,5) may send the ACK packet through Port D, then lock Port D (be set to busy). At the same time, the optical router Optical Router(6,5) with the same coordinates as Router(6,5) may be controlled to open the micro-ring resonator in the target transmission direction, which guarantees that the transmission direction of the optical information packet on the fiber is opposite to the transmission direction of the ACK packet. Moreover, if the input port of Router(6,5) is connected to the IP core, the input port is also locked. The ACK packet would be destroyed after the transmission of the ACK packet is complete. Port D would then wait for arrivals of other packets. Then, the ACK packet may be transmitted among a plurality of intermediate electrical routers until the ACK packet reaches the Router(0,1) which has the same coordinates as IP(0,1). In this process, each intermediate electrical router would perform a same procedure as Router(6,5). Later, the ACK packet may be transmitted through a port of Router(0,1) to the IP-Switch module of IP(0,1).

In step 8, upon receiving the ACK packet, IP(0,1) would destroy the ACK packet by the IP-Sink module. Then, an information packet would be put into an end of a buffer queue of an optical transmission port for optical network layer transmission.

In step 9, after the information packet is sent out from the optical transmission port of IP(0,1), an E/O conversion can be performed on the information packet by the electro-optical conversion module of IP(0,1) to obtain an optical information packet. Moreover, the optical information packet obtained can be transmitted in the optical network layer to an optical router connected.

After arriving at the first optical router Optical Router(0,1), the optical information packet may be transmitted in a path determined by the ACK packet. That is, the path along which the ACK packet was transmitted from the destination IP node through the second electrical router back to the source IP node is opposite to the path along which the optical information packet would be transmitted from the source IP node through the first optical router to the destination IP node. When an optical information packet passes through the optical routers. The optical fiber path of the optical information packet can be switched by the micro-ring resonator. As the optical information packet passes an optical router, the electrical router having the same coordinates as the optical router would be controlled to re-open the port locked when the ACK packet passes through. The above operations may be repeated until the optical information packet arrives at Optical Router(0,1) which has the same coordinates as the destination IP node.

In step 10, upon receiving the optical information packet, Optical Router(0,1) to which the destination IP node is connected would perform an O/E conversion on the optical information packet received by an optical-electrical conversion module. Then the IP-Switch module would clear the route information to end the routing process.

It should be noted that the method according to examples of the present disclosure may be performed by a single device, such as a computer or server. Moreover, the method according to examples of the present disclosure can also be applied to a distributed scenario, where the method can be implemented through cooperation of multiple devices. In the case of such a distributed scenario, one device of the plurality of devices may only perform one or more steps of the method, and the plurality of devices may interact with each other to perform the described method.

It is noted that some examples of the present disclosure have been described above. Other examples are within the scope of the following claims. In some cases, the acts or steps recited in the claims may be performed in a different order than in the examples described above and can still achieve desirable results. Additionally, the processes depicted in the accompanying drawings do not necessarily require the particular order shown, or sequential order, to achieve desirable results. In some examples, multi-tasking and parallel processing are also possible or may be advantageous.

Examples of the present disclosure also provides an electronic device, which includes a memory, a processor, and a computer program stored in the memory and executable on the processor, the processor executes the program to implement the low congestion routing method of ONOC.

Figure 7:
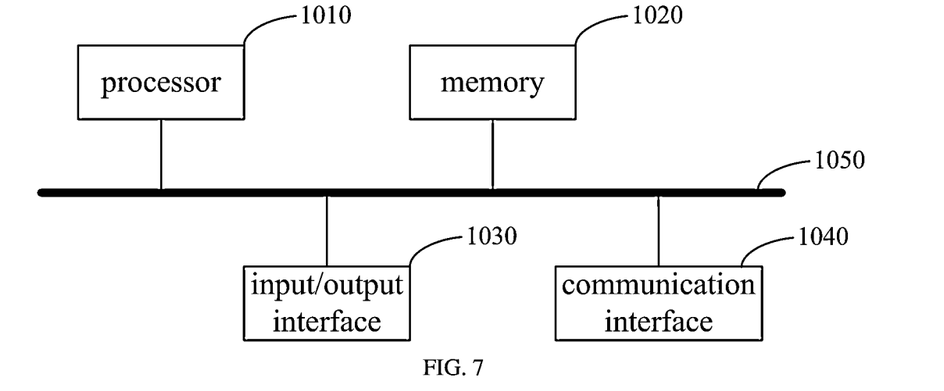
FIG. 7 is a schematic diagram illustrating a structure of an electronic device according to examples of the present disclosure.

FIG. 7 is a schematic diagram illustrating a structure of an electronic device according to some examples of the present disclosure. As shown in FIG. 7, the electronic device may include: a processor 1010, a memory 1020, an input/output interface 1030, a communication interface 1040, and a bus 1050. The processor 1010, the memory 1020, the input/output interface 1030, and the communication interface 1040 may couple to each other via the bus 1050.

The processor 1010 may execute the relevant procedures by virtue of a general central processing unit (CPU), a microprocessor, an application specific integrated circuit (ASIC), or one or more integrated circuits, so as to implement the technical solution provided by the examples of the description.

The memory 1020 may be implemented by a read only memory (ROM), a random-access memory (RAM), a static memory device and a dynamic memory device, etc. The memory 1020 may store an operating system and other application procedures. When the technical solution provided by the example of the description is implemented via the software or the hardware, the related procedure codes are stored in the memory 1020 and revoked by the processor 1010.

The I/O interface 1030 is used for connecting an I/O unit to realize information input and output. The I/O unit may be configured in the device (not in the figure) as a component configuration, and may be externally connected to the device to provide the corresponding functions. The input device may include keyboard, mouse, touch screen, microphone and various sensors. The output device may include display, loudspeaker, vibrator and indicator lamp.

A communication interface 1040 is used for connecting a communication unit (not shown in the figure) to realize communication interaction between the device and other devices. The communication unit may realize communication in a wired manner (for example, USB, wire, etc.) or in a wireless manner (for example, mobile network, WIFI, Bluetooth, etc.).

The bus 1050 includes a passage which transmits information among various components (for example, the processor 1010, the memory 1020, the I/O interface 1030 and the communication interface 1040) on the device.

It should be noted that, although the above-mentioned device merely shows the processor 1010, the memory 1020, the I/O interface 1030, the communication interface 1040 and the bus 1050, the device may further include other components required by the normal operation in the specific implementation process. Besides, those skilled in the art could appreciate that the above-mentioned device may merely include the components required by the solution in the examples of the Description, but not necessarily include all components shown in the figure.

The above-mentioned device of the present disclosure is used to realize the low congestion routing method of ONOC in accordance with any of the above examples, and has the beneficial effects of the corresponding method, which will not be repeated here.

Based on a same inventive concept, examples of the present disclosure also provides a non-transitory computer-readable storage medium, which stores a computer instruction. The computer instruction is used to make a computer execute the low congestion routing method of ONoC in accordance with any of the above examples.

The computer-readable storage medium in the example includes volatile, non-volatile, movable and non-movable media, which can realize information storage by any method or technology. The information can be computer readable instruction, data structure, program unit or other data. The example of computer storage media includes, but not limited to phase-change memory (PRAM), static random access memory (SRAM), dynamic random access memory (DRAM), other types of random access memory (RAM), read only memory (ROM), electrically erasable programmable read-only memory (EEPROM), flash memory or other memory technologies, compact disk read only memory (CD-ROM), digital versatile disc (DVD) or other optical memories, cassette magnetic tape, tape, disk memory or other magnetic memory device or any other non-transmission media, and available for storing information accessible by the computing devices.

Based on a same inventive concept of the low congestion routing method of ONOC described in any of the above examples, the present disclosure also provides a computer program, which includes computer instructions. In some examples, the computer instructions may be executed by one or more processors of a computer to enable the computer and/or processor to execute the low congestion routing method of ONOC. Corresponding to the execution subject of each step in examples of the low congestion routing method of ONOC, the processor executing the corresponding step can belong to the corresponding execution subject.

The computer program of the above example is used to enable the computer and/or processor to execute a low congestion routing method of ONOC as described in any one of the above examples, and has the beneficial effects of corresponding methods, which will not be repeated here.

Those of ordinary skill in the art should appreciate that the discussion on any one of the foregoing examples is merely exemplary, but is not intended to imply that the scope of the present disclosure (including the claims) is limited to these examples. Under the idea of the present disclosure, the technical features of the foregoing examples or different examples may be combined, the steps may be implemented in any order, and there are many other variations in different aspects of the examples of the present disclosure, all of which are not provided in detail for simplicity.

Besides, for the sake of simplifying description and discussion and not making the examples of the present disclosure difficult to understand, the provided drawings may show or not show the public power supply/earthing connection to an integrated circuit (IC) chip and other parts. Besides, the device may be shown in block diagram form to prevent the examples of the present disclosure from being difficult, and moreover, this considers the following facts, that is, the details of the implementations with regard to the devices in these block diagrams highly depend on the platform which will implement the examples of the present disclosure (that is, these details should be completely within the scope understood by those skilled in the art). Where specific details (e.g. circuits) are set forth in order to describe exemplary examples of the present disclosure, it should be apparent to those skilled in the art that the examples of the present disclosure can be practiced without, or with variation of, these specific details. Therefore, these descriptions shall be considered to be illustrative instead of restrictive thereto. Therefore, these descriptions shall be considered to be illustrative instead of restrictive thereto.

While the present disclosure has been described in conjunction with specific examples thereof, many alternatives, modifications and variations of such examples will be apparent to those of ordinary skill in the art in light of the foregoing description. For example, other memory architectures, such as dynamic RAM (DRAM), may use the examples discussed.

The examples of the disclosure are intended to embrace all such alternatives, modifications, and variations as to fall within the broad scope of the appended claims. Therefore, any omission, modification, equivalent replacement and improvement made within the spirits and principles of the examples of the present disclosure shall fall within the protection scope of the present disclosure.

What is claimed is:

1. A low congestion routing method of an Optical Network-on-Chip (ONoC), wherein, the ONoC is an ONoC with a Mesh topology; an electrical router and an optical router connecting to a same IP router have same coordinates with the IP router; and the method comprises:

sending, by a source IP node, a route setup request to a first electrical router connected to the source IP node; wherein, the route setup request comprises coordinates of the source IP node and coordinates of a destination IP node; and coordinates of the first electrical router are the same as the coordinates of the source IP node;

receiving, by the first electrical router, the route setup request from the source IP node; determining a first target output port according to congestion information of buffer queues in transmittable directions and random numbers through an arbitration; sending the route setup request to the destination IP node through the first target output port;

receiving, by the destination IP node, the route setup request; analyzing information about the source IP node in the route setup request; generating an Acknowledge (ACK) packet; sending the ACK packet to a second electrical router connected with the destination IP node; wherein, the second electrical router is connected with the destination IP node and coordinates of the second electrical router are the same as the coordinates of the destination IP node;

receiving, by the second electrical router, the ACK packet from the destination IP node; determining a second target output port according to congestion information of buffer queues in transmittable directions and random numbers through an arbitration; sending the ACK packet to the source IP node through the second target output port; locking the second target output port; controlling an optical router having the same coordinates as the second electrical router to turn on a micro-ring resonator in a corresponding direction; wherein, the corresponding direction refers to a direction opposite to a transmission direction of the ACK packet;

receiving, by the source IP node, the ACK packet; transmitting the ACK packet to an optical transmission port;

performing, by the source IP node, an Electro-Optical (E/O) conversion on the ACK packet to obtain an optical information packet; sending the optical information packet to a first optical router connected to the source IP node;

receiving, by the first optical router, the optical information packet from the source IP node; sending the optical information packet through a micro-ring resonator in the corresponding direction to the second optical router connected to the destination IP node; controlling the first electrical router having the same coordinates as the first optical router to open the second target output port;

receiving, by the second optical router, the optical information packet; sending the optical information packet to the destination IP node; receiving, by the destination IP node, the optical information packet; and performing an Optical-Electro (O/E) conversion on the optical information packet; wherein, the congestion information comprises: the number of packets buffered;

the determining a first target output port according to congestion information of buffer queues in transmittable directions and random numbers through an arbitration comprises:

determining a port of a first transmittable direction and a port of a second transmittable direction of the first electrical router according to the coordinates of the source IP node, the coordinates of the destination IP node and directions of ports of the first electrical router connecting with other electrical routers;

determining a first arbitration range for the port of the first transmittable direction based on the number of packets in a first buffer queue of the port of the first transmittable direction;

determining a second arbitration range for the port of the second transmittable direction based on the number of packets in a second buffer queue of the port of the second transmittable direction;

generating a first random number according to the first arbitration range;

generating a second random number according to the second arbitration range; and determining the first target output port according to the first random number and the second random number; and the determining a second target output port according to congestion information of buffer queues in transmittable directions and random numbers through an arbitration comprises:

determining a port of a third transmittable direction and a port of a fourth transmittable direction of the second electrical router according to the coordinates of the destination IP node, the coordinates of the source IP node and directions of ports of the second electrical router connecting with other electrical routers;

determining a third arbitration range for the port of the third transmittable direction based on the number of packets in a third buffer queue of the port of the third transmittable direction;

determining a fourth arbitration range for the port of the fourth transmittable direction based on the number of packets in a fourth buffer queue of the port of the fourth transmittable direction;

generating a third random number according to the third arbitration range;

generating a fourth random number according to the fourth arbitration range; and determining the second target output port according to the third random number and the fourth random number.

2. The low congestion routing method of the ONOC according to claim 1, wherein, the determining the first target output port according to the first random number and the second random number comprises:

comparing the first random number and the second random number;

in response to determining that the first random number is less than the second random number, determining that the port of the first transmittable direction is the first target output port; or in response to determining that the first random number is greater than the second random number, determining that the port of the second transmittable direction is the first target output port.

3. The low congestion routing method of the ONOC according to claim 1, wherein, the determining the second target output port according to the third random number and the fourth random number comprises:

comparing the third random number and the fourth random number;

in response to determining that the third random number is less than the fourth random number, determining that the port of the third transmittable direction is the second target output port; or in response to determining that the third random number is greater than the fourth random number, determining that the port of the fourth transmittable direction is the second target output port.

4. The low congestion routing method of the ONOC according to claim 1, after sending the route setup request through the first target output port to the second electrical router connecting the first target output port, further comprising:

locking, by the first electrical router, the first target output port;

in response to determining that the route setup request in the first target output port is sent out, clearing, by the first electrical router, the route setup request and opening the first target output port.

5. The low congestion routing method of the ONOC according to claim 1, further comprising: in response to determining that the ACK packet is sent out, clearing, by the second electrical router, the ACK packet.

6. An electronic device, comprising a memory, a processor, and a computer program stored in the memory and executable on the processor, wherein the processor executes the computer program to implement the method according to claim 1.

7. A non-transitory computer-readable storage medium, storing a computer instruction, wherein the computer instruction is used to make a computer execute the method according to claim 1.

* * * * *